Oct. 11, 1960 C. F. MOSIER, JR., ET AL 2,956,012
TREATING COPPER CHLORIDE SWEETENING CATALYST
WITH TERTIARY BUTYL CATECHOL
Filed Nov. 24, 1958
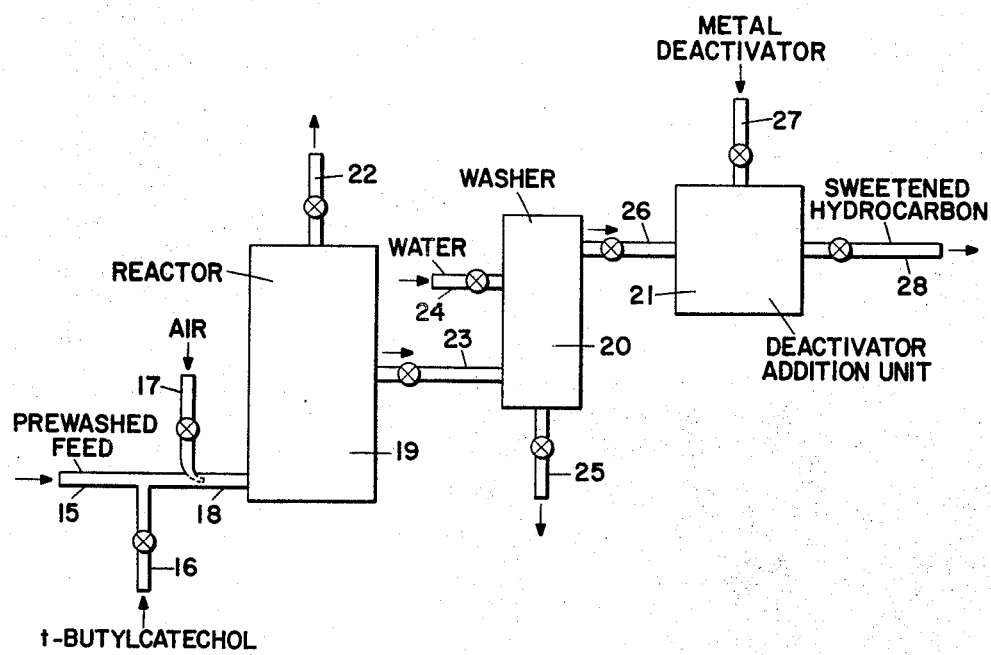
Raymond L. Betts
Charles F. Mosier, Jr.   INVENTORS
BY Robert J. Pearlman
AGENT United States Patent Office 2,956,012
Patented Oct. 11, 1960

2,956,012

TREATING COPPER CHLORIDE SWEETENING CATALYST WITH TERTIARY BUTYL CATECHOL

Charles F. Mosier, Jr., Garwood, and Raymond L. Betts, Westfield, N.J., assignors to Esso Research and Engineering Company, a corporation of Delaware Filed Nov. 24, 1958, Ser. No. 776,005

9 Claims. (Cl. 208—195)

The present invention is concerned with an improved method of sweetening hydrocarbons by contact with a copper chloride catalyst. More particularly, it deals with a process for treating said copper chloride catalyst so as to produce a sweetened hydrocarbon product of improved color properties.

As is well known, various petroleum oil fractions, particularly those derived from high sulfur content crudes, contain undesirable quantities of mercaptans. Since mercaptans give the oil fractions a noxious odor, they must be removed or converted to other less odorous materials. Among the processes developed to solve this problem is the copper chloride sweetening process.

Copper chloride sweetening is an established commercial process well known to those skilled in the art. The process serves to convert the mercaptans to disulfides by oxidation, the disulfides normally not exhibiting appreciable objectionable odors. Briefly described, the feed is first caustic prewashed to remove hydrogen sulfide and reduce the concentration of phenols and mercaptans. After water washing and drying, the feed with admixed air is passed through a fixed bed of catalyst, normally copper chloride on a clay. Alternatively, the feed and admixed air may be mixed with a slurry of catalyst. The sweetening, i.e. oxidation of mercaptides, is rapid. Slurry is allowed to settle from the sweetened product, the latter therafter being washed with water or aqueous alkaline sodium sulfide followed by water. The sweetening reaction occurs as cupric chloride oxidizes mercaptans to disulfides and its itself reduced to cuprous chloride. The dissolved oxygen oxidizes the cuprous chloride to the cupric form and the cycle is repeated.

Conventionally, a metal deactivator is added to neutralize any remaining copper and thus preserve the color of the hydrocarbon product at about that at which it leaves the sweetening step. A more detailed description of conventional copper chloride sweetening may be found in "Petroleum Refining with Chemicals," Kalichevsky, V. A., Kobe, K. A. (Elsevier Publishing Co., Amsterdam, 1956).

Though copper sweetening is a relatively cheap and efficient means of solving the mercaptan odor problem, it suffers from an important disadvantage. When treating certain hydrocarbons, i.e. those boiling above about 350° F., such as virgin middle distillate, the sweetened product has exhibited poor initial color properties as compared to the color of the hydrocarbon prior to sweetening. Thus, there may be a color loss of as much as 10 Saybolt units (ASTM D-156) upon copper chloride sweetening indicative of substantial darkening. Such color loss is undesirable in that a darkened product has poor consumer appeal since it is frequently associated with undesirable properties such as gum and sediment formation.

In accordance with the present invention, means are set forth whereby a hydrocarbon oil having an initial boiling point of 300 to 350° F. or greater may be sweetened without adversely affecting color properties. A sweetened product of good initial color and good color stability is obtained. More specifically, the copper chloride catalyst is pretreated with p-tertiary butyl catechol. The hydrocarbon is contacted with the treated catalyst to yield a sweetened oil of good initial color properties, i. e. a color loss of less than 2 Saybolt units as compared to the unsweetened oil feed.

A metal deactivator is then added to the sweetened oil so as to preserve its color at the relatively high level resulting from the present sweetening method. In some cases such as where high smoke point is desired, the addition of metal deactivator is not desired and some sacrifice is made in the product's color stability. However, even in such cases the initial color properties of the sweetened oil are markedly improved over that heretofore known.

Normally, it is neither necessary nor desirable to employ a continuous treatment of copper chloride with p-tertiary butyl catechol during the entire course of the sweetening reaction. Rather, the catalyst may be intermittently treated and the thus treated catalyst thereafter contacted with oil to be sweetened. The catalyst can be treated with p-tertiary butyl catechol in a step entirely distinct from hydrocarbon sweetening. However, in a preferred embodiment, p-tertiary butyl catechol is added for a limited time to the hydrocarbon stream fed to the sweetening step. This addition of catechol is then stopped, and sweetening continued on the thus treated catalyst. Generally, about 0.1 to 2.0 pounds of p-tertiary butyl catechol per thousand pounds of copper chloride catalyst is employed for each catalyst treatment.

It should be clearly noted that the present invention is distinct from the addition of amine or alkyl phenol type compounds to a sweetening step in order to prevent fouling of the clay support-adsorbent with gums. The latter materials serve a different purpose than that of p-tertiary butyl catechol and are not recognized in the art as having a significant effect on the color properties of the sweetened oil product.

By way of clarifying nomenclature, the term "copper chloride catalyst" is used to denote $CuCl_2 \cdot 2H_2O$ deposited on a moist carrier such as Attapulgus clay. Typical catalysts contain 5 to 15% $CuCl_2$ and 7 to 25% water.

The various aspects of the present invention will be made more clearly apparent by reference to the following description, drawing and accompanying example.

With reference to the drawing, a specific embodiment of the present invention will be described. Experimental results showing its advantages will thereafter be set forth.

A hydrocarbon feed such as a West Texas kerosene and having an initial boiling point of about 350° F. is to be sweetened by the use of the present improved copper chloride sweetening. The oil contains about 40 mg. of mercaptan sulfur/100 ml. of oil. The initial caustic treating, washing and drying steps are conventional and thus are not shown in the drawing. Very briefly described, the oil is prewashed with about 5 to 15° Bé. solution of sodium hydroxide to ensure its freedom from hydrogen sulfide which if present in the feed to the catalytic sweetening step would form unregenerable copper sulfide, thus wasting catalyst. After water washing with about 0.3 to 0.5 volumes of water, the oil is decanted and passed to a drying stage. Preferably, the prewashed feed is dried by passage over rock salt. If wash water were allowed to remain in the feed, the water subsequently formed in the sweetening step could not be dissolved in the oil and would therefore be absobed by the clay forming undesirable agglomerates.

Turning now to the drawing, the dried hydrocarbon oil passes through line 15 at a rate of 5.5 bbl. per hour per 1000 pounds of catalyst. This is equivalent to 0.77 pound of mercaptan sulfur per hour per 1000 pounds of catalyst. The oil feed has an initial color of +18 Saybolt and a color hold (16 hours) of +17 Saybolt units. In the embodiment illustrated, sweetening takes place in a fixed catalyst bed in reactor 19. However as previously noted, a slurry or a moving bed process may also be employed. About 10 times the theoretical requirement of an oxygen-containing gas, e.g. air, is mixed with the oil by means of conduit 17. A theory of oxygen is equivalent to 16 pounds of oxygen per 64 pounds of mercaptan sulfur. For the feed in this illustration, 19.8 standard cubic feet of air per barrel of feed are required. Preferably the air-oil combustion is passed through a mixing device, not shown, prior to introduction to the catalyst bed by line 18. The oxygen (air) and oil feed are passed upwardly through the catalyst bed. The catalyst is 5 to 15 wt. percent $CuCl_2 \cdot 2H_2O$ and 7 to 25 wt. percent water supported on a clay, such as Attapulgus clay. The sweetening reaction is carried out in the catalyst bed at about 80 to 120° F., e.g. 100° F., the necessary heat being supplied by preheating the oil feed. The copper, in the cupric state, oxidizes the mercaptans in the oil to disulfides while being reduced to the cuprous state. The dissolved or admixed oxygen then oxidizes the cuprous chloride to the cupric form. The sweetening reaction is then repeated.

The sweetened oil and air after passing through the catalyst bed are separated in the unpacked upper portion of the catalyst chamber. Air is vented through line 22. Oil leaves the reactor through line 23.

In accordance with the present invention, the copper chloride catalyst is treated with tertiary butyl catechol in order to improve the initial color properties of the sweetened oil product. Though this may be done prior to any contact of catalyst with the oil feed, the drawing illustrates an embodiment particularly suited to continuous sweetening operations and periodic treatment of the copper chloride catalyst. In this embodiment, p-tertiary butyl catechol is added to the hydrocarbon oil feed, ultimately contacting the catalyst in reactor 19 after passing through conduit 18. Assuming the catalyst has at no time been treated in accordance with the present invention, about 1 total lb. of p-tertiary butyl catechol per 1000 lbs. of catalyst to be treated is added by inlet 16 to the oil stream over a period of time, e.g. 5 hours. This addition is then halted, and sweetening allowed to take place with the treated catalyst. If the catalyst has been treated previously, i.e. a "regeneration" is desired, generally smaller quantities of p-tertiary butyl catechol would be added to the oil feed for a limited time period.

As it leaves the reactor, the oil contains about 0.2 mg. mercaptan sulfur per 100 ml. of oil and has a soluble copper content of about 0.2 to 1 mg./1. The sweetened oil is then passed to washer 20 by line 23 and subjected to water washing, about 0.3 to 0.5 volume percent of water at 60 to 120° F. being employed. Water containing the extracted copper and other treating residues is discharged through conduit 25. The washed sweetened oil is withdrawn by outlet 26. It now has a copper content of less than 0.2 mg./1.

Most importantly, the sweetened product has an initial color of +16 Saybolt units, or a color loss due to copper chloride sweetening of only about 2 units. If the same catalyst had not been treated with p-tertiary butyl catechol, the sweetened product would have exhibited an initial color loss of about 9 units. Thus, operating in accordance with the present invention gives a sweetened product of considerably lighter color than that heretofore secured in prior copper chloride sweetening processes.

Though treating the catalyst with p-tertiary butyl catechol effectively prevents initial color loss, it does not generally have a significant effect in promoting color stability. Thus, in order to stabilize the color of the sweetened product at its high level, a metal deactivator is generally added to the sweetened oil. Metal deactivators, per se, are well known. A common deactivator is N,N'-disalicylal-1,2-diaminopropane.

With reference to the drawing, about 2 pounds of metal deactivator (N,N' - disalicylal - 1,2 - diaminopropane) is added by line 27 to each 1000 barrels of sweetened product. The sweetened oil removed from unit 21 by line 28 thus has an initial color of +16 Saybolt units and a colorhold (16 hours) of about +16 Saybolt units.

The sweetened oil will find use as a heating or lighting kerosene and as a component of jet fuels and diesel fuels.

Experimental results evidencing the beneficial effects of treating a copper chloride catalyst are presented below.

It was desired to sweeten a West Texas light virgin heating oil having an initial boiling point of 350° F. In all of the experimental runs, the feed stock was subjected to a caustic wash with 10 vol. percent of 15° Bé. sodium hydroxide and the caustic treated oil water washed and freed from entrained water. Thereafter, the oil was passed upwardly through 75 grams of catalyst in a bed two feet in depth. The catalyst contained 9 wt. percent $CuCl_2 \cdot 2H_2O$. The feed oil and general operating conditions were the same for all runs. Run 1 was made with relatively fresh catalyst. Run 2 shows the results of adding 3 p.p.m. (based on oil) of p-tertiary butyl catechol to the hydrocarbon feed as it was passed to the copper chloride bed. The catalyst was treated with an excess of p-tertiary butyl catechol during Run 3 to ensure complete treatment of the copper chloride. Addition of p-tertiary butyl catechol was stopped and the oil feed sweetened with the thus treated catalyst in Run 4. In all runs, the sweetened oil was washed with 10 vol. percent of water twice before product inspections were determined.

Tabulated below are the feed stock and product inspections and the operating conditions employed.

*Table 1*

| Run Number | 1 | 2 | 3 | 4 |
| --- | --- | --- | --- | --- |
| Feedstock Inspection: | | | | |
| Mercaptan No., mg. S/100 ml. of feed int. | 38 | 38 | 38 | 38 |
| Color, Saybolt Units | +18 | +20 | +21 | +18 |
| Colorhold (16 hrs.), Saybolt Units | +17 | +16 | +18 | +17 |
| p-tertiary butyl catechol, p.p.m. | None | 3 | 30 | None |
| Total p-tertiary butyl catechol added, lb./1000 lbs. of catalyst | 0 | 0.13 | 1.25 | 0 |
| Operating Conditions: | | | | |
| Oil Rate, cc./min. | 2.1 | 2.6 | 2.3 | 2.7 |
| Air Rate, ft.³/hr. | 0.017 | 0.017 | 0.017 | 0.017 |
| Reactor Temperature, °F. | 94 | 94 | 94 | 94 |
| Length of Run, stream hours | 77 | 24 | 25 | 23 |
| Product Inspections: | | | | |
| Mercaptan No. mg./100 ml. | 0.2 | 0.2 | 0.5 | 0.4 |
| Copper Content, mg./liter | 0.05 | 0.06 | | 0.08 |
| Color, Saybolt Units | +9 | +11 | −5¼ | +16 |
| Colorhold, Tag Robinson Units | 18 | 18½ | 17¾ | 18½ |

The above data show the markedly improved initial color properties of the sweetened oil which has been contacted with fully treated copper chloride catalyst (Run 4). When comparing Runs 1 and 4, it is seen that application of the present invention results in a color loss of only 2 Saybolt units during sweetening as opposed to a loss of 9 units in Run 1 wherein a conventional copper chloride catalyst was employed. Though Run 2 indicates that some improvement results from partially treated catalyst, it is seen from Run 3 that excessive addition of p-tertiary butyl catechol is undesirable. The excess of tertiary butyl catechol apparently tends to be converted to a colored material, and degrades the oil sweetened during the catalyst treating step. Further, the runs indicate that the tertiary butyl catechol had no appreciable effect of promoting color stability.

In order to see the effect on color properties of conventional anti-oxidant materials and to test the effective life of the treated catalyst of Run 4, experimental Runs 5, 6, and 7 were performed. The feed was the same stock as in the previous runs and it was subjected to the same caustic washing procedure as in Runs 1-4. The catalyst was that used in Run 4 and the same catalyst was successively used in Runs 5, 6, and 7. The operating conditions were the same as in the former experiments and approximately 25 stream hours were employed in each run.

The principal difference between Runs 5 to 7 and those formerly described was the addition of conventional anti-oxidants to the feed to be sweetened.

Table 2

| Runs | 5 | 6 | 7 |
|---|---|---|---|
| Feed Inspection: | | | |
| Mercaptan No., mg. S/100 ml. | 38 | 38 | 38. |
| Color, Saybolt Units | Approx. +16. | +16 | +18. |
| Colorhold (16 hrs.) Saybolt Units. | | +9 | +17. |
| Additive, lb./1000 lbs. of catalyst treated. | 1.34 N,N' disec-butyl p-phenyl-ene-diamine. | 1.45 2,6-di-tertiary butyl, 4 methyl phenol. | None. |
| Product Inspection (after water wash): | | | |
| Mercaptan No | 0.4 | 0.2 | 0.2. |
| Copper Content, mg./liter | 0.13 | 0.12 | |
| Color, Saybolt Units | -1 | -2 | +16. |

Runs 5 and 6 show that the addition of prior art anti-oxidants failed to improve the initial color properties of the sweetened product. When compared to Run 1, it is observed that their addition aggravated, rather than alleviated, the color problem. However, when (Run 7) the additives were no longer added to the oil feed stream and sweetening was permitted to occur merely with the catalyst previously treated with tertiary butyl catechol, products with a color of +16 Saybolt units were obtained.

The above results indicate that copper chloride catalyst treated with tertiary butyl catechol significantly improved color properties of the sweetened oil whereas prior art anti-oxidants failed to show advantageous results.

The color stabilizing properties of metal deactivators are well established in the prior art, e.g. see U.S. Patent 2,255,597. Thus, an experimental showing of their action is superfluous. By adding such metal deactivators to the oil sweetened by the presently treated copper chloride catalyst, its color is stabilized at approximately its high initial value.

Tabulated below is a compilation of data applicable to the system heretofore described.

Table 3

| | Broad Range | Preferred Range |
|---|---|---|
| Sweetening Temperature, ° F | 80 to 120 | 90 to 110. |
| Total p-Tertiary butyl Catechol added per Treatment, lbs./1000 lbs. of catalyst treated. | 0.1 to 2.0 | 1.0 to 1.5. |
| Maximum Initial Color Loss due to Sweetening, Saybolt Units. | | 2. |

It will thus be seen that application of the present invention results in sweetened hydrocarbon oil products having substantially better color properties than was hitherto obtained by prior copper chloride sweetening operations. Having described the present invention, that which is sought to be protected is set forth in the following claims.

What is claimed is:
1. In the process of sweetening a hydrocarbon fraction by subjecting said fraction to contact with a copper chloride catalyst, the improved method of sweetening said hydrocarbon fraction while obtaining a sweetened product of good color properties which comprises: treating said copper chloride catalyst with tertiary butyl catechol, and contacting said hydrocarbon fraction with said thus treated catalyst thus forming a sweetened product of low initial color loss.

2. The improved method of claim 1 wherein a metal deactivator is added to said sweetened hydrocarbon fraction to promote its color stability.

3. The improved method of claim 1 wherein said tertiary butyl catechol is added to the hydrocarbon fraction to be sweetened in an amount falling within the range of 0.1 to 2.0 pounds per 1000 pounds of catalyst per treatment prior to contacting said hydrocarbon fraction with said copper chloride catalyst.

4. The improved method of claim 1 wherein said hydrocarbon fraction is a virgin middle distillate, and the initial color loss of said sweetened product as compared to said hydrocarbon feed fraction is less than 2 Saybolt units.

5. In the process of sweetening a hydrocarbon by contacting it with copper chloride supported on clay, the improved method of sweetening said hydrocarbon which comprises: treating said copper chloride catalyst with p-tertiary butyl catechol and contacting said thus treated catalyst with said hydrocarbon whereby a sweetened product of good initial color properties is obtained.

6. The improved method of claim 5 wherein said hydrocarbon has an initial boiling point of at least 300 to 350° F. and wherein the quantity of p-tertiary butyl catechol employed for a single treatment of said copper chloride catalyst is within the range of 1.0 to 1.5 pounds per 1000 pounds of catalyst treated.

7. An improved method of copper chloride sweetening a virgin middle distillate which comprises: treating copper chloride catalyst with p-tertiary butyl catechol by adding to said distillate to be contacted with said catalyst 0.1 to 2.0 pounds of p-tertiary butyl catechol per 1000 pounds of copper chloride to be given a single treatment, contacting said distillate and catechol with said catalyst for a limited period of time and thereafter contacting additional quantities of virgin middle distillate with said thus treated copper chloride catalyst to produce a sweetened product of good initial color properties.

8. The improved method of claim 7 wherein said sweetened product exhibits an initial color loss of less than 2 Saybolt units as compared with said distillate feed, and a metal deactivator is added to said sweetened product to promote its color stability.

9. An improved copper chloride catalyst for sweetening hydrocarbons which has been made by the process comprising, contacting said copper chloride with about 0.1 to 2.0 pounds of p-tertiary butyl catechol per 1000 pounds of copper chloride catalyst.

References Cited in the file of this patent
UNITED STATES PATENTS
2,457,635    Bond et al. _____ Dec. 28, 1948